(No Model.)

W. C. CHAMBERLAIN.
NUT LOCK.

No. 367,023. Patented July 26, 1887.

Witnesses
Norris A. Clark,
Wm. J. Littell,

Inventor
William C. Chamberlain
By J. R. Littell,
Attorney

UNITED STATES PATENT OFFICE.

WILLIAM CARROLL CHAMBERLAIN, OF CEDAR BLUFF, VIRGINIA.

NUT-LOCK.

SPECIFICATION forming part of Letters Patent No. 367,023, dated July 26, 1887.

Application filed April 6, 1887. Serial No. 233,915. (No model.)

*To all whom it may concern:*

Be it known that I, WILLIAM CARROLL CHAMBERLAIN, a citizen of the United States, residing at Cedar Bluff, in the county of Tazewell and State of Virginia, have invented certain new and useful Improvements in Nut-Locks, of which the following is a specification.

This invention relates to nut-locks, and its object is to provide a device of this class which will possess advantages in point of simplicity, durability, and general efficiency, and one which can be manufactured and supplied at a moderate cost.

Figure 1:
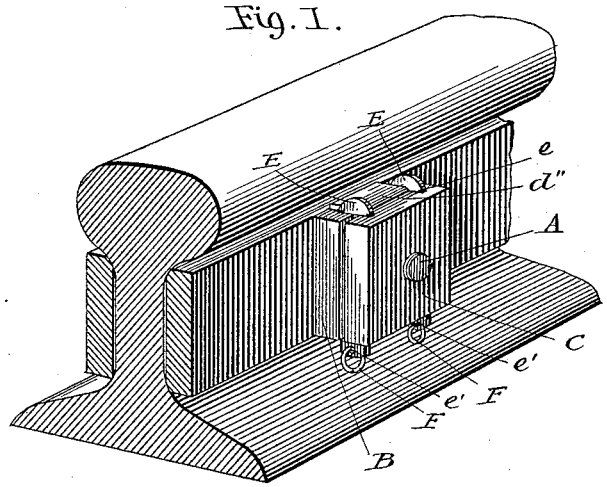
Figure 2:
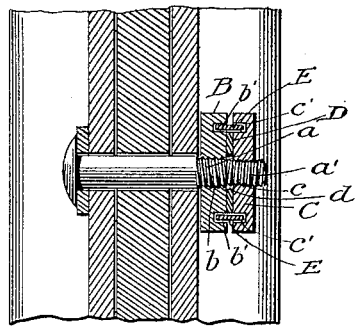
Figure 3:
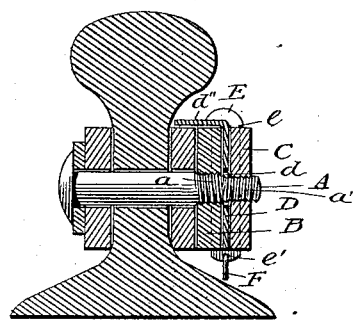
Figure 4:

In the drawings, Figure 1 is a perspective view of a nut-lock embodying my improvements. Fig. 2 is a longitudinal sectional view taken through the bolt. Fig. 3 is a corresponding view taken at right angles to the section shown in Fig. 2. Fig. 4 is a detail perspective view of one of the locking-keys and retaining-rings.

Corresponding parts in the figures are denoted by the same letters of reference.

Referring to the drawings, A designates the bolt, which is provided with the usual head at one end and at its other end with right and left hand screw-threads $a$ $a'$, respectively, the right-hand or inner threads being of greater diameter than the left-hand threads at the end of the bolt.

B designates the inner nut, rectangular in form and having an eye or opening, $b$, through its center, said opening being provided with right-hand screw-threads corresponding to and adapted to engage the right-hand threaded portion of the bolt. This nut is also provided with transverse grooves $b'$ in its outer face, said grooves being on opposite sides of the opening $b$ and parallel with each other.

C designates an outer nut, similar in shape to the nut B, having a left-hand screw-threaded central opening, $c$, corresponding to the screw-threads on the end of the bolt. The parallel grooves $c'$ are provided on the inner face of the outer nut, corresponding to the grooves $b'$ on the inner nut, and registering with the same when the nuts are in locked position.

Between the nuts B and C is interposed a washer, D, provided with an eye or opening, $d$, in its main portion to admit of the passage of the end of the bolt, and having a right-angular flange or extension, $d''$, at one end. This washer is disposed longitudinally with relation to the grooves $b'$ and $c'$, occupying the surface of the nuts between the same, and the flange $d''$ rests against one of the sides of the inner nut. The office of this washer is to regulate the relation of the nuts so as to cause the grooves $b'$ and $c'$ to register with each other when the nuts are in position for locking.

E designates two keys formed with shoulders $e$ at one end and with eyes $e'$ at the opposite ends, said eyes being engaged by rings F. These keys are adapted to be disposed in the slots formed by the grooves of the nuts when the nuts are in position for locking, and are retained therein by the rings. These rings F are preferably bent up from spring-wire, so that their engaging ends may be separated, as illustrated in dotted lines, Fig. 4, for engagement with the eyes $e'$.

I claim as my invention—

1. In a nut-lock, the combination of the bolt having the right and left hand screw-threaded portions, corresponding right and left hand nuts provided with a transverse groove in their adjoining faces at each side of the central eye, said grooves being parallel, a washer inserted between the adjoining faces of the nuts and occupying the surface between the parallel grooves and provided with the right-angular flange or extension, and keys fitting in the slots formed by the registering grooves when the nuts are in position for locking, and resting against the edges of the washer, substantially as and for the purpose set forth.

2. In a nut-lock, the combination of the bolt having the right and left hand screw-threaded portions, corresponding right and left hand nuts having the parallel transverse grooves formed in their adjoining faces at each side of the central eye or opening, a washer interposed between the adjoining faces of the nut and occupying the surfaces between the grooves and formed with a right-angular flange or extension, keys inserted in the slots formed by the registering grooves and provided with shoulders at one end and with an eye or perforation at the other, and the retaining-ring engaging said perforations, substantially as and for the purpose set forth.

In testimony whereof I affix my signature in presence of two witnesses.

WILLIAM CARROLL CHAMBERLAIN.

Witnesses:
THOMAS W. WINGO,
JAMES CAMPBELL SPOTTS.